(12) United States Patent
Strack et al.

(10) Patent No.: US 7,570,855 B2
(45) Date of Patent: Aug. 4, 2009

(54) CONDUIT BUNDLES INCLUDING FIRST-TYPE AND SECOND-TYPE CONDUITS WITH DISPARATE PROPERTIES

(75) Inventors: Richard Strack, Charlton, MA (US); Martin Freundt, Aachen (DE)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 11/698,557

(22) Filed: Jan. 26, 2007

(65) Prior Publication Data

US 2007/0183727 A1 Aug. 9, 2007

Related U.S. Application Data

(60) Provisional application No. 60/764,942, filed on Feb. 3, 2006.

(51) Int. Cl.
G02B 6/06 (2006.01)
G02B 6/04 (2006.01)
G02B 6/44 (2006.01)

(52) U.S. Cl. .................. 385/115; 385/100; 385/102; 385/109; 385/116

(58) Field of Classification Search .......... 385/100, 385/102, 109, 115, 116
See application file for complete search history.

(56) References Cited

U.S. PATENT DOCUMENTS

| | | | |
|---|---|---|---|
| 3,554,721 A | 1/1971 | Gardner | |
| 3,580,775 A | 5/1971 | Siegmund | |
| 3,830,667 A | 8/1974 | Carpenter | |
| 3,933,556 A | 1/1976 | Strack | |
| 3,981,706 A | 9/1976 | Strack | |
| 4,832,722 A | 5/1989 | Henderson | |
| 5,550,945 A * | 8/1996 | Gregory | 385/116 |
| 5,935,288 A | 8/1999 | DiGiovanni et al. | |
| 6,089,044 A | 7/2000 | Hardy et al. | |
| 6,845,204 B1 * | 1/2005 | Broeng et al. | 385/126 |

* cited by examiner

*Primary Examiner*—Frank G Font
*Assistant Examiner*—Michael P Mooney
(74) *Attorney, Agent, or Firm*—Louis J. Franco; Law Office of Louis J. Franco (57) ABSTRACT

A conduit bundle includes an inner bundle of first-type conduits extending between inner-bundle first and second ends. The first-type conduits are mutually and adjacently bonded along coinciding portions of their lengths in order to define an inner-bundle rigid region that, as view into a plane orthogonal to the longitudinal axis of the inner-bundle rigid region, exhibits an inner-bundle periphery. A separation structure including a structure wall having structure-wall inside and outside surfaces is provided and the inside surface thereof is bonded to the periphery of the inner-bundle rigid region. The conduit bundle further includes a plurality of second-type conduits. Each second-type conduit includes a rigidly bonded region along at least a portion of the length thereof that is bonded to at least one of (i) the structure-wall outside surface and (ii) the bonded region of another second-type conduit of the plurality of second-type conduits.

18 Claims, 6 Drawing Sheets

FIG. 1A
*(Background)*

FIG. 1B
*(Background)* mask mask

FIG. 1C
*(Background)*

FIG. 1D
*(Background)*

CONDUIT BUNDLES INCLUDING FIRST-TYPE AND SECOND-TYPE CONDUITS WITH DISPARATE PROPERTIES

PROVISIONAL PRIORITY CLAIM

Priority based on Provisional Application, Ser. No. 60/764,942 filed Feb. 3, 2006, and entitled "CONDUIT BUNDLES INCLUDING FIRST-TYPE AND SECOND-TYPE CONDUITS WITH DISPARATE PROPERTIES AND METHODS OF FABRICATING THE SAME" is claimed. The entirety of the disclosure of the previous provisional application, including the drawings, is incorporated herein by reference as if set forth fully in the present application.

BACKGROUND

1. Field

Although not so limited in its utility or scope, implementations and embodiments of the present invention relate to the fabrication and structures of illuminable image-transporting optical fiber bundles.

2. Brief Description of Illustrative Environments and Related Art

Illuminable image-transporting optical fiber bundles are well-known to practitioners in the field of optical-fiber component fabrication. Generally, such an illuminable image-transporting bundle includes a first, typically inner bundle of fused or otherwise adjacently and rigidly bonded optical fibers that combine to form an image conduit for transporting an image between coherently arranged first and second image-bundle ends. The image bundle may be rigid throughout its length or include a central flexible region as is known to those in the related art; a key aspect, however, is retaining the ends of the individual optical fibers included in the image bundle in fixed relative positions in order to maintain image integrity between the image-input and image-output ends. A second, typically outer bundle or "branch" of light-conducting fibers conducts light from a remote source and projects that light onto objects the images of which are introduced into the image-input end of the imaging portion of the overall optical fiber bundle assembly.

Figure 1A:
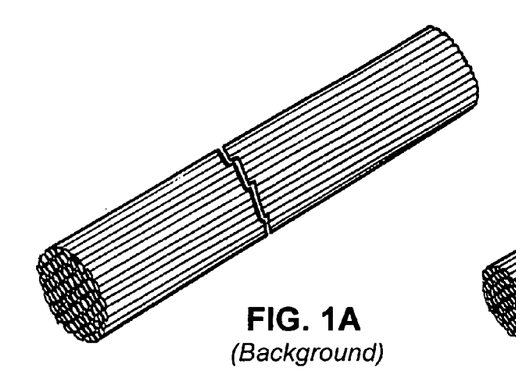
FIG. 1A shows a fused optical fiber bundle.
Figure 1B:
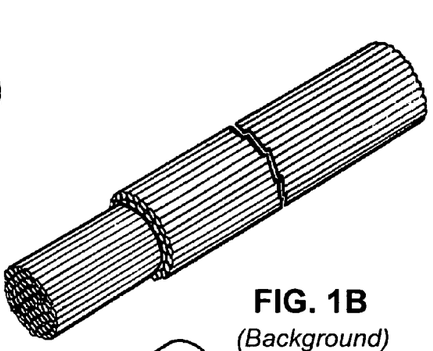
FIG. 1B shows an optical fiber bundle in which the fibers of a selected set of outermost fibers have been cut back in order to expose cut-back ends thereof.
Figure 1C:
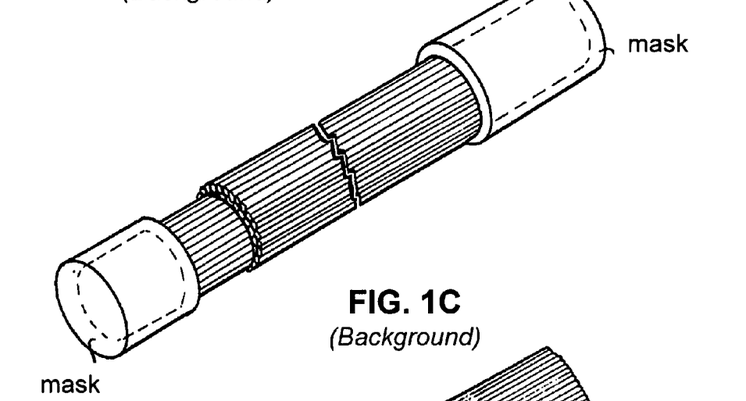
FIG. 1C depicts a mask of solvent-resistant coating material over the ends of the remaining, non-cut fibers at the end of the bundle from which the selected fibers were cut and over the opposite, non-cut end of the bundle.
Figure 1D:
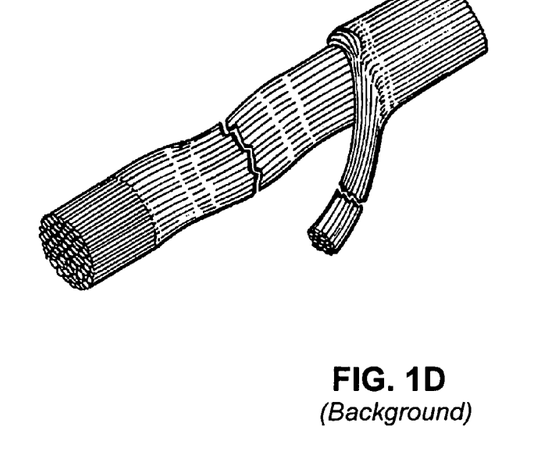
FIG. 1D shows a branched fiber optic viewing device including imaging fibers and illuminable fibers resulting from the immersion in solvent of the masked bundle shown in FIG. 1C.

Although the scope of the present invention is not limited to illuminable image-transporting fiber bundles, representative examples of how, traditionally, such fiber bundles are fabricated informs an appreciation for more general aspects of the invention. An early, and still relevant, "method of fabricating illuminated fiber optics" is described in U.S. Pat. No. 3,674,452 issued in the name of R. R. Strack on Jul. 4, 1972 (hereinafter the '452 patent), major aspects of which are described below in conjunction with FIGS. 1A-1D. According to the method of the '452 patent, the fabrication of a branched fiber optic viewing device adapted to conduct illuminating light to objects to be viewed thereby through one branch of the device and simultaneously transport images of the illuminated objects to a remote viewing location through another branch of the device is initiated by positioning a multiplicity of light-transmitting optical fibers in parallel side-by-side relationship with each other as a bundle having opposite ends of said fibers disposed in identical geometrical patterns at corresponding opposite ends of the bundle, the fibers each having an outer, leachable cladding of silica-free acid soluble glass. The fibers are then fused together along the full length of the bundle, such as by heating and drawing in an optical fiber drawing tower, to yield a fused optical fiber bundle such as the illustrative bundle of FIG. 1A. As shown in FIG. 1B, a selected set of outermost fibers of the bundle adjacent one end of the bundle is cut back (e.g., machined) in order to shorten the selected outermost fibers and expose cut-back ends thereof intermediately of the length of the bundle. Referring to FIG. 1C, the ends of the remaining (i.e., non-cut) fibers at the end of the bundle from which the selected fibers were cut are masked with, for example, an acid-resistant coating material, and the opposite, non-cut end of the bundle is similarly masked. Once masked, the bundle is immersed in an acidic solvent (not shown) in order to leach the outer claddings of silica-free glass away from all uncovered portions of all fibers and render each fiber independently flexible and to free the exposed cut-back ends of the outermost fibers from each other and from adjacent other fibers of the bundle. A selected set of the freed cut-back ends of the outermost fibers is then gathered together as a group adjacent one side of the remaining fibers of said bundle whereby said gathered-together outermost fibers comprise said one branch (e.g., an illuminating branch) of the device for receiving and conducting light to objects intended for viewing by the branched fiber optic viewing device, as shown in FIG. 1D.

While the basic principles taught by Strack in the '452 patent remain among the standards for the fabrication of illuminable image-transporting fiber bundles, disadvantages accompany the method taught in the '452 patent and other, similar methods. For instance, the machining away of a section of the fused bundle extending axially and, in the case of a cylindrical bundle, radially inwardly in order to cut back selected outer fibers for ultimate use as flexible illuminating fibers can damage (e.g., shatter and splinter) several layers of both outer illuminating and inner imaging fibers, rendering such fibers unusable for their intended purposes. Moreover, general handling of the fused bundle in preparation for, and execution of, steps subsequent to its initial formation sometimes results in physical damage to exterior fibers. In addition to the aforementioned machining performed in preparation for masking and leaching, the unleached end of a fiber bundle of the general type previously described is sometimes machined in order to configure it for cooperative engagement with a housing, coupling or another optical component, such as a lens. For instance, in one alternative configuration, the fused ends of illuminating optical fibers are machined away so that the imaging fibers terminate at an image-input face and the illuminating fibers terminate at a peripheral light-emission face that is recessed with respect to the image-input face. In alternative aspects, end portions of the imaging fibers are machined away to form an image-input face that it recessed with respect to the peripheral light-emission face to form a channel into which, for example, one or more optical elements (e.g., a lens) is mounted for focusing an image onto the image-input face. It will be appreciated that machining for the latter purposes subjects the fused bundle to the same risk of fiber damage previously described in connection with preparing the fused bundle for leaching.

Accordingly, there exists a need for a fused bundle configuration that can be handled and machined with a minimized risk of damage to constituent optical fibers of the imaging or illuminating varieties.

SUMMARY

In a first illustrative embodiment, a conduit bundle includes an inner bundled set (hereinafter, "inner bundle") of plural elongated first-type conduits mutually and adjacently bonded along coinciding portions of the lengths of the first-type conduits such that at least a region of the length of the inner bundle is rigid. At least the rigid region of the inner bundle (i) extends for a length along an inner-bundle axis along which the adjacently bonded portions of the constituent first-type conduits extend and (ii) is defined by at least one side such that, as viewed into a cross-sectional plane oriented orthogonally to the inner-bundle axis, the inner bundle exhibits a cross-sectional geometry defined by an inner-bundle periphery. Moreover, each constituent first-type conduit of a selected set of first-type conduits exhibits, at least within the rigid region, a first cross-sectional geometry and a first diameter consistent, to within a predetermined tolerance, with a first set of pre-established dimensional parameters.

The first illustrative embodiment further includes a plurality of elongated second-type conduits, each of which second-type conduits includes a region along the length thereof that is bonded to one of the at least one sides of the rigid region of the inner bundle and axially aligned with the inner-bundle axis. Furthermore, each second-type conduit exhibits, at least along that portion of the second-type conduit that is bonded to the rigid region, a second cross-sectional geometry and a second diameter consistent, to within a specified tolerance, with a second set of pre-established dimensional parameters. In alternative embodiments, the second diameter is one of (i) equal to and (ii) different from the first diameter, and the second cross-sectional geometry is one of (i) similar to and (ii) different from the first cross-sectional geometry. Additionally, although "diameter" is frequently thought of narrowly as the longest chord that can be fit within the curve defining a circle, the more general definition of that term is applicable to this description and the appended claims for all purposes. For instance, chords within squares, rectangles, hexagons, and even irregular shapes are also diameters. Nothing in the preceding explanation should be construed to attribute to the term "diameter" a meaning more narrow than common usage and technical mathematical usage would attribute to them.

Various embodiments are configured as illuminable image-transporting fiber bundles in which some of the conduits are imaging conduits extending longitudinally between image-input and image-output ends of the bundle and other conduits are illumination conduits configured and arranged to deliver light from a light source some distance from the image-input end to a location more proximate the image-input end. In one such illustrative embodiment, each first-type conduit is a light-conductive imaging conduit comprising an optically transmissive core having an imaging-core refractive index and being surrounded by a cladding material having an imaging-cladding refractive index lower than the imaging-core refractive index such that light propagates through the first-type conduit by total internal reflection and such that the plural first-type conduits combine to form an image-conducting bundle that is a sub-portion of the overall illuminable image-transporting fiber bundle. In the present illustrative embodiment, each second-type conduit is a light-conductive illumination conduit comprising a light-transmissive core having an illumination-core refractive index surrounded by a cladding material having an illumination-cladding refractive index. Typically, in such an embodiment, the bonding of at least the first-type conduits of the inner bundle to one another is achieved by heat fusion of cladding material during the heating and drawing of a plurality of adjacently bundled mono-fibers (or clad rods) from an optical fiber drawing tower, in accordance with processes well-known to those of skill in the related art, although the scope of the invention as defined in the appended claims is not limited in this regard, absent express limitations to the contrary. Similarly, bonding of the illumination conduits to the periphery of the inner-bundle rigid region may be achieved by fusion either (i) contemporaneously or (ii) subsequent to the fusion of the imaging-conduits to one another. Alternatively, as with the mutual bonding of the imaging conduits, the illumination conduits may be bonded by a method other than, or in addition to, fusion, such as the application of a curable adhesive or the application of pressure.

The rigid portion of adjacently-fused imaging conduits terminates in an input-end face configured for inputting the image of an object for transmission of the image through the inner image-conducting bundle. Each illumination conduit includes a light-collecting end and a longitudinally opposed light-emission end wherein the light-emission end is sufficiently proximate the input-end face to project light introduced into the light-collecting end onto the object the image of which is to be transmitted through the image bundle. In various versions, the diameter of each illumination conduit of a selected set of illumination conduits is larger than the diameter of each imaging conduit of a selected set of imaging conduits. This latter attribute realizes the observations that (i) a bundle incorporating a larger number of smaller-diameter fibers per unit cross-sectional area generally facilitates better imaging than a bundle incorporating a smaller number of larger-diameter fibers per unit cross-sectional area and (ii) larger diameter fibers are typically preferred over smaller ones for illumination applications.

As described in the background, sections of a fused bundle are machined away for any of various reasons and this machining is frequently accompanied, in the case, for example, of a bundle including imaging and illumination conduits, by damage to conduits of either or both types. Accordingly, various versions include at least one rigid separation layer (or "separation structure") interposed between conduits of the first and second types (e.g., imaging and illumination conduits). For instance, in one illustrative example, a bundled set of inner, adjacently-fused imaging conduits is entirely surrounded, along at least a portion of the length of the inner-bundle rigid region, by a glass sleeve (or tube) that is of continuous (e.g. non-fibrous) construction. To the outside surface of the glass sleeve are located the second-type illuminating conduits. The inner imaging-conduits are bonded to the outer illumination conduits by virtue of the inside surface of the glass sleeve being peripherally bonded to the at least one side of the inner-bundle rigid region and the second-type illuminating conduits being bonded to the outside surface of the glass sleeve. Typically, the inner imaging conduits and the illuminating conduits are fusedly bonded to the separation sleeve, with the sleeve being included as a component of a heated and drawn and/or heated and pressed assembly. Depending on whether a particular fabrication process prescribes leaching of areas of the image-bundle rigid portion covered by the separation structure, the material from which the separation structure is fabricated may be relatively soluble or insoluble in a solution used to leach other portions of the conduit bundle. In any event, by machining into the separation layer for purposes such as those previously described, selected sections of either imaging or illuminating conduits can be removed without causing collateral damage to the other type of conduits.

In still additional embodiments, an outermost protective layer is bonded around the illumination conduits to protect them from incidental damage during various stages of handling prior to the leaching of the imaging conduits to render them separate and flexible.

In alternative embodiments, at least one type of conduit of the first-type and second-type conduits is not an optically transmissive conduit. For instance, in one alternative version, each conduit of at least one of the first and second type is a capillary including a hollow channel extending therethrough between its first and second ends. The inclusion of capillaries in various versions facilitates the alternative delivery and extraction of fluid (e.g. gas or liquid) to and from a working end of the conduit bundle. In some versions including capillaries, each conduit of only one of the first-type and second-type conduits is a capillary, while in other versions each conduit of both the first-type and second-type conduits is a capillary. As with embodiments in which capillaries of neither the first or second type are capillaries, a bundle of adjacently-bonded capillaries may be formed by any of (i) the heating and drawing of a plurality of adjacently-bundle tubes, (ii) the application of a curable adhesive to a plurality of tubes, and (iii) the application of pressure, in addition to either or both of heat and adhesive. As is known to those of skill in the relevant arts, the heating and drawing of hollow tubes to the end of forming capillary structures is frequently a difficult and tedious process, particularly when the desired inside capillary diameter is very small. Nevertheless, formation of capillary bundles by heating and drawing is known with sufficient generality to obviate the necessity of a description of fabrication particulars. Alternative previous methods of capillary bundle fabrication include heating and drawing a bundle of core rods, each of which is surrounded by a cladding. Once heated and drawn such that the claddings of plural clad rods are mutually fused, the cores are leached from the cladding material, leaving behind a "honeycomb" capillary array comprising cladding material and a plurality of hollow channels. Leaching methods of capillary-array fabrication are limited by physical parameters such as drawn-core diameter and the length of the fused bundle. More specifically, there are limits as to how small the diameters of, and how long, the cores incorporated into an elongated bundle of fused cladding material can be before leaching proves in impracticable method of core removal.

Having described the structural features of various illustrative conduit bundles, illustrative methods of fabricating a conduit bundle are now described.

A first fabrication method includes arranging a plurality of elongated first-type conduits in parallel side-by-side relationship with each other as an inner bundle having opposite ends of the first-type conduits disposed at corresponding opposite ends of the inner bundle. The first-type conduits are bonded together along at least a portion of the length of the inner bundle with a first-type-conduit bonding material such that at least that portion of the inner bundle along which the first-type conduits are mutually and adjacently bonded constitutes an inner-bundle rigid region extending along an inner-bundle axis and exhibiting a cross-sectional geometry defined by an inner-bundle periphery. A separation structure including a structure wall having structure-wall inside and outside surfaces is provided and affixed to the inner bundle by bonding the structure-wall inside surface about at least a portion of the inner-bundle periphery. A plurality of elongated second-type conduits is provided and each second-type conduit of a selected set of the second-type conduits is bonded to the structure-wall outside surface and, typically, to at least one other second-type conduit, in side-by-side axial alignment with the inner bundle axis. The second-type conduits are bonded using a second-type-conduit bonding material and such that each second-type conduit of the selected set of second-type conduits includes a bonded region along the length of the second-type conduit that is bonded to the inner-bundle periphery of the inner-bundle rigid region (through its bond to the separation structure).

In one alternative fabrication method, each of the first-type conduits, the second-type conduits, and the separation structure is fabricated from a heat-fusible glass. The step of bonding the first-type conduits together along at least a portion of the length of the inner bundle includes mutually heat-fusing the first-type conduits together along the full length of the bundle. The first-type-conduit bonding material is the fused glass from which the first-type conduits are fabricated. The separation structure, which is in the form of a tube, is slid over the bundled first-type conduits and the structure-wall inside surface is bonded about at least a portion of the inner-bundle periphery by collapsing and heat-fusing the separation structure about the periphery of the inner-bundle rigid region. It will be appreciated by those of skill in, for example, the optical-fiber component fabrication industry that the tubular separation structure may be collapsed about the inner bundle of first-type conduits by heating and drawing the inner bundle and separation structure in an optical fiber drawing tower. Similarly, bonding of each second-type conduit of a selected set of the second-type conduits to the structure-wall outside surface comprises heat-fusing each selected second-type conduit to the structure-wall outside surface along the full length of the second-type conduit such that the bonded region extends for the full length of the second-type conduit.

It will be appreciated that the various fusing steps described above may be performed contemporaneously or sequentially. For instance, an illustrative sequential execution of fusing involves mutually fusing, as by heating and drawing, a plurality of adjacently bundled first-type conduits to form a fused inner bundle. Subsequently, the separation structure tube is disposed about the fused inner bundle and then collapsed and fused about the inner bundle. Next, a plurality of the second-type conduits is heated and fused to the structure-wall outside surface by, for example, temporarily binding the second-type conduits in contacting engagement with the structure-wall outside surface and heating and drawing an entire assembly including the already-fused inner bundle and separation structure and the second-type conduits.

Alternatively, an illustrative contemporaneous heat-fusing process involves bundling the first-type conduits to form an inner bundle, disposing the separation structure about the bundled first-type conduits, and temporarily binding the second-type conduits in contacting engagement with the structure-wall outside surface to form an assembly which is then subsequently heated and drawn contemporaneously. It will be readily appreciated that the inner bundle may be formed by packing a plurality of first-type conduits into a tubular separating structure and that, therefore, the assembling of the inner bundle need not be performed as a step separate from disposing the separation structure about the inner bundle.

It will be appreciated that in instances such as those described immediately above in which the mode of bonding a second-type conduit is heat fusion, the second-type-conduit bonding material is at least one of (i) the fused glass from which the second-type conduit is fabricated, (ii) fused glass from which the structure-wall outer surface is fabricated and (iii) fused glass from which at least one other second-type conduit is fabricated.

Still additional methods of fabrication resulting in a conduit bundle having (i) an inner bundle of elongated first-type conduits that is at least partially rigid along a longitudinally extending inner-bundle rigid region and (ii) a plurality of elongated second-type conduits, each of which second-type conduits includes a first, bonded region along the length thereof that is bonded to the inner-bundle rigid region and a second, flexible region that is free to move relative to the inner-bundle rigid region are now described. In accordance with one alternative implementation, each second-type conduit has an outermost cladding of soluble glass extending along the full length of the second-type conduit prior to the heat-fusion of the second-type conduit to the outside surface of the separation structure. With the second-type conduits fused to the structure-wall outside surface, selected portions of the bonded regions of selected second-type conduits are exposed to a solvent in order to leach soluble glass therefrom and render the portions selected for leaching independently flexible and free from fused attachment to the structure-wall outside surface. Portions may be selectively leached by various methods. According to one method, portions in which leaching is not desired are masked with a coating material (e.g. plastic or paraffin) before exposing (e.g., immersing) the entire assembly in a solvent. Alternatively, as will be typical of bundles formed according to methods within the scope of the invention, the flexible region of each second-type conduit will include a first end of that conduit and extend toward, but not all the way to, the second end of that conduit. Accordingly, the entire fused assembly including the mutually fused inner bundle, separation structure and second-type conduits may be partially immersed in a bath of solvent (e.g. suspended vertically) such that an end of the assembly is above the solvent level in the bath.

A fused assembly such as that described above may terminate in two opposed planar faces at which faces ends of (i) the inner bundle, (ii) the separation structure and (iii) the second-type conduits all coincide prior to leaching. This may be the case because, after fusing, the conduit bundle may be cut at opposed ends along planes orthogonal (or obliquely) to the inner bundle axis. Depending on the desired final form of the bundle, in terms of its inclusion of rigid and flexible regions, various masking and leaching procedures may be undertaken. For instance, in one illustrative circumstance in which it is desired that the inner bundle of first-type conduits remain rigid throughout its full length such that only the outer second-type conduits will include flexible regions, the separation structure is fabricated from a material that is relatively insoluble in the solvent selected to leach the outermost cladding from the fused second-type conduits. In another words, the separation structure serves as a mask of "coating material" for the first-type conduits. Moreover, the portions of either or both end faces at which the inner first-type conduits terminate are masked to prevent dissolution of the first-type conduits or, alternatively, the first-type conduits are also fabricated from a material that is relatively insoluble in the solvent selected to leach the outermost cladding material from the second-type conduits.

Under alternative circumstances, particularly when the first-type conduits are imaging conduits combined to form an image-conducting bundle, it may be desirable to have at least one inner-bundle flexible region between the opposed inner-bundle rigid ends at which ends the first-type conduit ends are fusedly retained in, to the extent practicable, identical geometric patterns. Typically, the imaging conduits in such a case will comprise an optically transmissive core, a first, optical cladding immediately around and in contact with the core and, over the optical cladding, an outmost cladding of soluble glass extending along the full length of the first-type conduit prior to the collective heat-fusion of the first-type conduits to one another. The heat fusion creates a fused bundle of plural imaging conduits fusedly retained within a matrix of soluble outmost-cladding material, as is commonly known to those in the optical-fiber component manufacturing field. In a typical implementation, the tubular separation structure is also fabricated from a soluble material so that it can be selectively leached.

Steps in an illustrative method of fabricating an illuminable image-transporting fiber bundle including (i) an inner image-conducting bundle having an inner-bundle flexible region between longitudinally opposed image-input and image-output ends; (ii) a plurality of outer illumination conduits, each of which has a bonded region and a flexible region; and (iii) a separation structure interposed between an inner-bundle rigid region and the bonded regions of the illumination conduits is now described. In an manner described previously in association with other methods, a plurality of elongated imaging conduits is arranged in parallel side-by-side relationship with each other as an inner bundle having opposite ends of the imaging conduits disposed at corresponding opposite ends of the inner bundle. Each imaging conduit has an optically transmissive core having an imaging-core refractive index, a first optical cladding having an imaging-cladding refractive index lower than the imaging-core refractive index, and an outmost cladding of glass that is soluble, relative to other components of the bundle, in a first predetermined solvent. The imaging conduits are fused together along the full length of the inner bundle to form a rigid inner image-conducting bundle extending along an inner-bundle axis and exhibiting a cross-sectional geometry defined by an inner-bundle periphery.

The imaging conduits of the inner bundle are introduced into a tubular (but not necessarily cylindrical) separation structure including a structure wall having structure-wall inside and outside surfaces extending between separation-structure first and second ends. The structure wall is fabricated from a glass that is soluble in a second predetermined solvent. The structure-wall inside surface fused about at least a portion of the length of the inner-bundle periphery.

A plurality of elongated, light-conductive illumination conduits is provided. Each illumination conduit includes a light-transmissive core having and illumination-core refractive index surrounded by a cladding having an illumination-cladding refractive index, and an outermost cladding of glass that is soluble in a third predetermined solvent. The illumination conduits are fused to the structure-wall outside surface in side-by-side axial alignment with the inner bundle axis along the full lengths of the illumination conduits in order to form a fused conduit assembly having first and second assembly ends corresponding to, respectively, the image-input and image-output ends of the inner image-conducting bundle and the separation-structure first and second ends. The method prescribes cutting back the illumination conduits and an outer portion of the structure wall from around the inner image-conducting bundle such that a portion of the image-conducting bundle including the image-output end protrudes relative to the cut-back ends of the illumination conduits and such that an inner portion of the structure wall remains disposed about the protruding portion of the image-conducting bundle. The cut-back ends of the illumination conduits constitute light-collection ends and the ends opposite the cut-back ends, and coinciding with the first assembly end, constituting light-emission ends.

Following the cutting back of the illumination conduits, at least a portion of the protruding portion of the image-conducting bundle including the image-output end and a portion of the length of the structure wall including the separation-structure second end and extending toward the separation-structure first end with is masked in coating material. The coating material is relatively insoluble in the at least one predetermined solvent selected for leaching at least one of (i) fused outermost cladding material from selected regions of the illumination conduits including the light-collection ends, (ii) at least one selected region along the length of the separation structure intermediate the separation-structure first and second ends, and (iii) fused outmost cladding material from a region of the image-conducting bundle intermediate that fused image-input and image-output ends. Subsequent to the aforementioned masking, the illustrative method prescribes exposing to at least one predetermined solvent at least a portion of the length of the fused conduit assembly including the light-collection ends, and extending toward, but not including, the light-emission ends of the illumination conduits in order to leach (i) fused outermost cladding material from selected regions of the illumination conduits including the light-collection ends, (ii) at least one selected region along the length of the separation structure intermediate the separation-structure first and second ends, and (iii) fused outmost cladding material from a region of the image-conducting bundle intermediate that fused image-input and image-output ends. Those of ordinary skill in the related art will appreciate that the leaching aspects may be executed in various stages.

The functional aspects of conduit bundles resulting from any of the illustrative methods are dependent, of course, on the types of conduits used in the fabrication. Various conduit types are described in connection with the apparatus aspects of the invention, which aspects, and the structures and elements described in association therewith, provide more-than-adequate explanatory support for the method aspects.

Representative, non-limiting embodiments and implementations are more completely described and depicted in the following detailed description and the accompanying drawings. Although specific versions are described as embodying as imaging conduits and illumination conduits, within the scope and contemplation of the invention as expressed in the appended claims are embodiments for alternative applications.

DETAILED DESCRIPTION

The following description of various embodiments of a conduit bundle is illustrative in nature and is therefore not intended to limit the scope of the invention or its application of uses.

Figures 2, 2A:
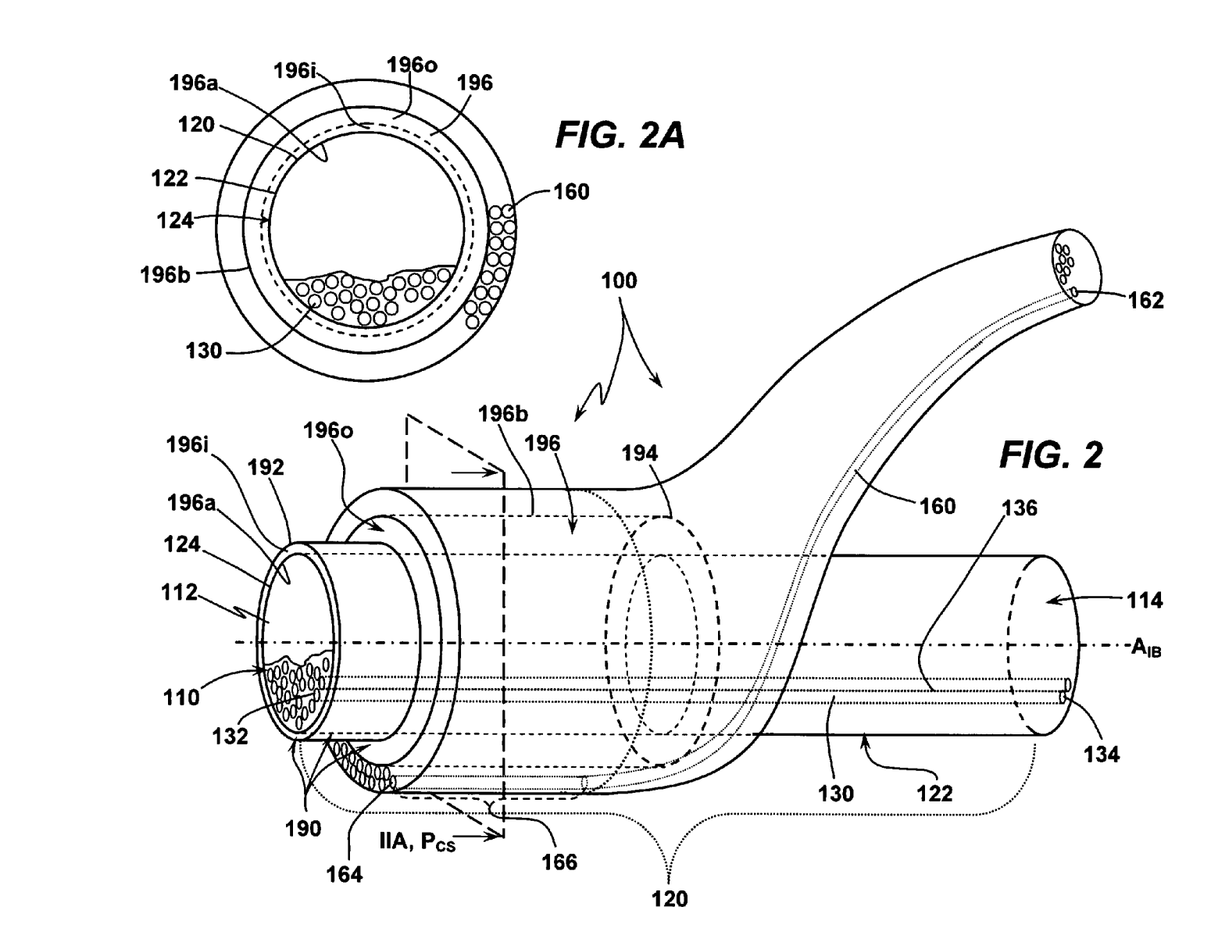
FIG. 2 depicts a conduit bundle including an inner bundle of adjacently bonded first-type conduits encased inside a separation structure to the outside surface of which separation structure are bonded conduits of a second type.
FIG. 2A is a cross-sectional view of the conduit bundle of FIG. 2 as viewed into the plane $P_{CS}$.

A first illustrative conduit bundle 100 is shown in FIG. 2. The conduit bundle 100 includes an inner bundled set 110 (or inner bundle 110) of plural elongated first-type conduits 130, each first-type conduit having a first end 132 and a second end 134. The inner bundle extends between inner-bundle first and second ends 112 and 114. The constituent first-type conduits 130 are mutually and adjacently bonded along coinciding conduit portions 136 of the lengths of the first-type conduits 130 such that at least a region 120 along the length of the inner bundle 110 is rigid. In the particular embodiment of FIG. 2, the inner-bundle rigid region 120 is co-extensive with the length of the inner bundle 110, but alternative, non-depicted embodiments within the scope of the invention are such that the inner-bundle rigid region 120 extends for less than the full length of the inner bundle 110.

At least the rigid region 120 of the inner bundle 110 extends for a length along an inner-bundle axis $A_{IB}$ along which the adjacently bonded portions 136 of the constituent first-type conduits 130 extend. The rigid region 120 is, furthermore, defined by at least one inner-bundle side 122 such that, as viewed into a cross-sectional plane $P_{CS}$ oriented orthogonally to the inner-bundle axis $A_{IB}$, the inner bundle 110 exhibits a cross-sectional geometry defined by an inner-bundle periphery 124. Moreover, each constituent first-type conduit 130 of a selected set of first-type conduits 130 exhibits, at least within the inner-bundle rigid region 120, a first cross-sectional geometry and a first diameter consistent, to within a predetermined tolerance, with a first set of pre-established dimensional parameters. For simplicity, the illustrative inner-bundle rigid region 120 is depicted as cylindrical and, therefore, exhibits a single, cylindrical inner-bundle side 122 and, as shown in FIG. 2A, a circular cross-section as viewed into the plane $P_{CS}$ (also referenced as IIA) of FIG. 2. Moreover, the constituent first-type conduits 130 are also depicted with circular cross-sections.

The conduit bundle 100 of FIGS. 2 and 2A further includes a plurality of elongated second-type conduits 160, each of which second-type conduits 160 includes first and second ends 162 and 164 and a bonded region 166 along the length thereof that is bonded to the inner-bundle side 122 of the inner-bundle rigid region 120 and axially aligned with the inner-bundle axis $A_{IB}$. Furthermore, each second-type conduit 160 exhibits, at least along its bonded region 166, a second cross-sectional geometry and a second diameter consistent, to within a specified tolerance, with a second set of pre-established dimensional parameters. The bonded region 166 of each second-type conduit 160 is rigid while the remaining portions of the illustrative second-type conduits 166, between the bonded regions 166 and the first ends 162 thereof, are flexible. Again, for the sake of simplicity, the second-type conduits 160 are depicted with circular cross-sections, but it is to be understood that the first-type conduits 130 and the second-type conduits 160 may be of dissimilar cross-sectional geometries. Furthermore, although in the illustrative embodiment depicted in FIGS. 2 and 2A the second-type conduits 160 exhibit diameters equal to those of the first-type conduits 130, embodiments in which the first diameter is smaller or larger than the second diameter are within the scope and contemplation of the invention as expressed in the appended claims. Additionally, first-type and second-type conduits 130 and 160 may, in various embodiments, comport with identical design specifications and may therefore be distinguishable from one another only on the basis of the purpose to which each type is ultimately put or on the basis of physical positioning within the overall conduit bundle 100.

In addition to an inner bundle 110 of first-type conduits 130 and a plurality of outer, second-type conduits 160, the embodiment of FIGS. 2 and 2A further includes a rigid separation layer 190 interposed between, and bonded to, conduits of the first and second types 130 and 160. The separation layer 190, which may be alternatively referred to as "separation structure 190," of FIGS. 2 and 2A includes separation-structure first and second ends 192 and 194 between which a structure wall 196 having structure-wall inside and outside surfaces 196a and 196b extends. The separation structure 190 provides a clean delineation between the first-type and second-type conduits 130 and 160 and, furthermore, as previously described, provides material into which one desiring to machine away portions of at least one type of the first-type and second-type conduits 130 and 160 can do so with reduced risk of collateral damage to conduits 130 or 160 of the other type. In the embodiment of FIG. 2, the second-type conduits 160 have been cut back (e.g., machined), along with an outer annular portion $196_O$ of the structure wall 196 such that (i) first ends 132 of the first-type conduits 130, and an inner annular portion $196i$ of lesser radius than the outer annular portion $196_O$, extend beyond (i.e., protrude with respect to) the second ends 164 of the second-type conduits 160 and (ii) the separation structure 190 includes a stepped shoulder (not numbered) delineating the outer annular portion $196_O$ from an inner annular portion $196_i$ of lesser radius. Depending on the nature of the conduits 130 and 160, and the intended applications of a particular embodiment of the conduit bundle 100, the separation structure 190 may be fabricated from any of a number of materials including, by way of non-limiting example, plastic, metal, ceramic and glass.

Figures 3, 3A:
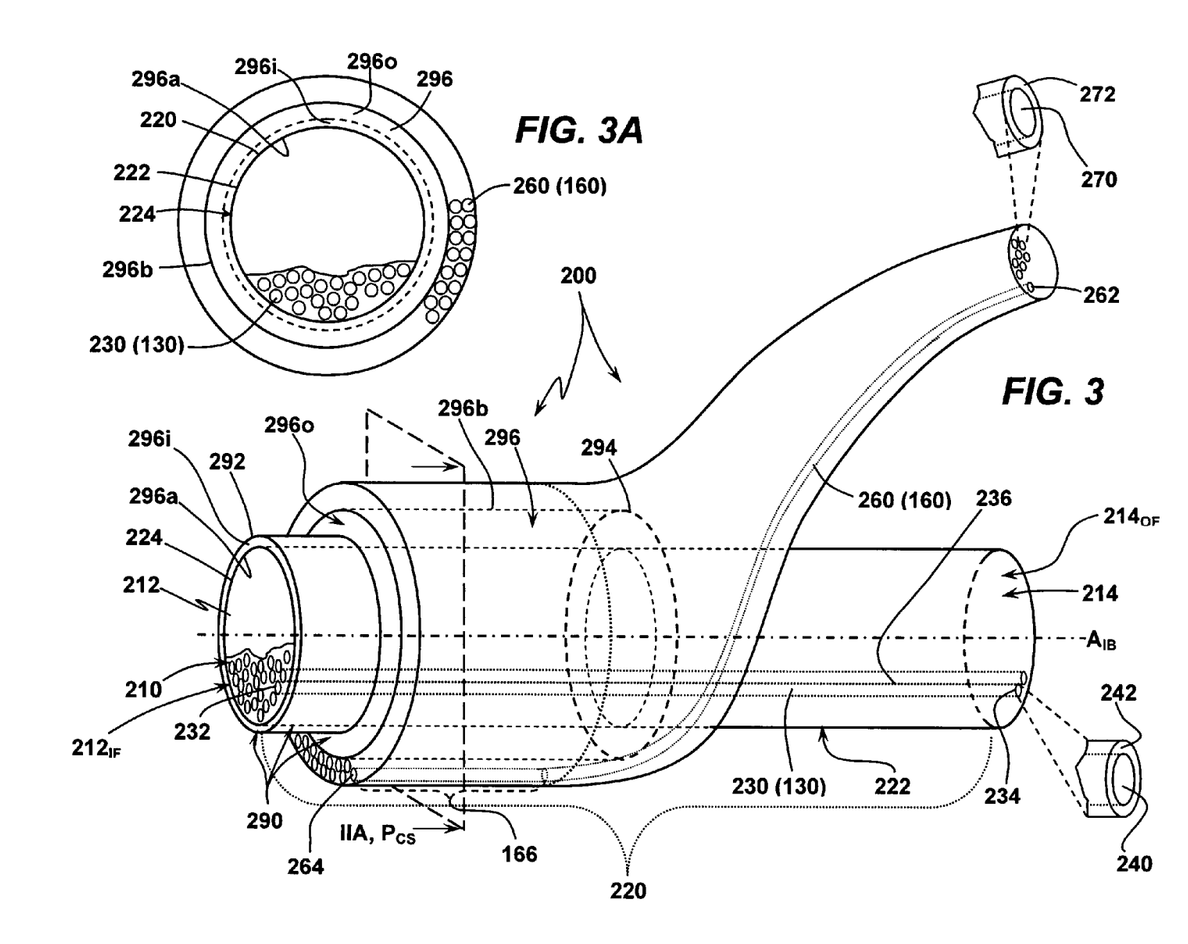
FIG. 3 shows a conduit bundle structurally analogous to the bundle of FIGS. 2 and 2A, wherein the first-type conduits are imaging conduits combining to form an inner image-conducting bundle, the second-type conduits are illumination conduits, and the separation structure is a glass layer bonded to each of the image-conducting bundle and the outer illumination conduits.
FIG. 3A is a cross-sectional view of the conduit bundle of FIG. 3 as viewed into the plane $P_{CS}$.

As discussed in the summary, the natures of the first-type and second-type conduits 130 and 160 may vary with the intended application of a particular embodiment of the conduit bundle 100. In a typical embodiment, however, both the first-type and second-type conduits are light-transmissive conduits (e.g. optical fibers). While FIGS. 2 and 2A depict a generic conduit bundle 100 within the scope of the invention, FIGS. 3 and 3A depict a more particular version in which the conduit bundle 100 is an illuminable image-transporting fiber bundle 200. In the version of FIGS. 3 and 3A, each element of the fiber bundle 200 having a generic counterpart in the version of FIGS. 2 and 2A is numbered with a reference number beginning in "2," but ending in the same two digits in which the reference number associated with the generic counterpart ends. Moreover, the reference number associated with the generic counterpart may appear in parenthesis adjacent the primary reference number associated with the more specific embodiment under consideration. Based on the aforesaid reference-numbering system, there appear in FIGS. 3 and 3A several reference numbers beginning with the digit "2" that are not specifically mentioned in the current detailed description. However, it is to be understood by the reader that this occurs only in association with elements having a generic, previously described counterpart referenced by a number in the 100's and that the generic counterpart, combined with the understanding that reference numbers beginning in "2" relate to embodiments in which the first and second-type conduits are light transmissive serves as support for such a reference number. For instance, the reference number "266" is never discussed below in the detailed description; however, the numbering scheme associated with the generic embodiment renders clear that "166" refers to a bonded region 166 along the length of each second-type conduit 160. Moreover, the context of the discussion below renders clear that the second-type conduits 160 of the embodiment of FIG. 3 are light-conductive illumination conduits 260. Accordingly, "266," while never described, is to be understood as being a rigid region 266 along the length of each light-conductive illumination conduit 260. Elements of the embodiment of FIGS. 3 and 3A not having a generic counterpart in the version of FIGS. 2 and 2A are associated with reference numbers in which the final two digits are unique relative to the reference numbers associated with elements of the version of FIGS. 2 and 2A.

Referring now to FIGS. 3 and 3A, an illuminable image-transporting fiber bundle 200 includes an image-conducting bundle 210 comprising a plurality of light-conductive imaging conduits 230. Each imaging conduit 230 includes first and second ends 232 and 234 and comprises an optically transmissive core 240 having an imaging-core refractive index. Each core 240 is surrounded by a cladding material 242 having an imaging-cladding refractive index lower than the imaging-core refractive index such that light propagates through the imaging conduit 230 by total internal reflection. In the present illustrative embodiment, each second-type conduit 160 is a light-conductive illumination conduit 260 comprising a light-transmissive core 270 having an illumination-core refractive index and being surrounded by a cladding material 272 having an illumination-cladding refractive index. Typically, in a version such as that of FIGS. 3 and 3A, the mutual bonding of at least the first-type imaging conduits 230 of the image-conducting bundle 210 is achieved by heat fusion of cladding material during the heating and drawing of a plurality of adjacently bundled mono-fibers (or clad rods) from an optical fiber drawing tower and/or heating under pressure in a die, in accordance with processes well-known to those of skill in the related art. Similarly, bonding of the illumination conduits 260 to the periphery 224 of the image-bundle rigid region 220 may be achieved by fusion either (i) contemporaneously with or (ii) subsequent to the fusion of the imaging conduits 230 to one another. Alternatively, as with the mutual bonding of the imaging conduits 230, the illumination conduits 260 may be bonded by a method other than, or in addition to, fusion, such as the application of a curable adhesive or the application of pressure.

The rigid region 220 of adjacently-fused imaging conduits 230 terminates in an input-end face $212_{IF}$ corresponding to the first end 212 of the image-conducting bundle 210 and configured for inputting the image (not depicted) of an object (not depicted) for transmission of the image through the inner image-conducting bundle 210 to an output end face $214_{OF}$ corresponding to the second end 214 of the image-conducting bundle 210. Each illumination conduit 260 includes a first, light-collecting end 262 and a second, longitudinally-opposed light-emission end 264 wherein the light-emission end 264 is sufficiently proximate the input-end face $212_{IF}$ to project light introduced into the light-collecting end 262 onto the object the image of which is to be transmitted through the image-conducting bundle 210.

The separation structure 290 interposed between, and retaining in bonded relationship, the image-conducting bundle 210 and the illumination conduits 260 is typically of vitreous, non-fibrous construction. Moreover, in a typical version of an illuminable image-transporting fiber bundle 200, the peripheral bonding of the inside surface 296a of the structure wall 296 to the image-bundle side 222, and the bonding of the illumination conduits 260 to the outside surface 296b of the structure wall 296, is achieved by heat fusion. In alternative versions, the separation structure 290 is (i) opaque and (ii) translucent. Versions incorporating an opaque or translucent, but not totally transparent, separation structure 290 prevent the introduction into the image-conducting bundle 210 of illuminating light that may leak from illumination conduits 260. Hereinafter, for purposes of simplicity, particularly in the appended claims, a separation structure that is not totally transparent may be referred to as "at least partially opaque."

Figures 4, 4A:
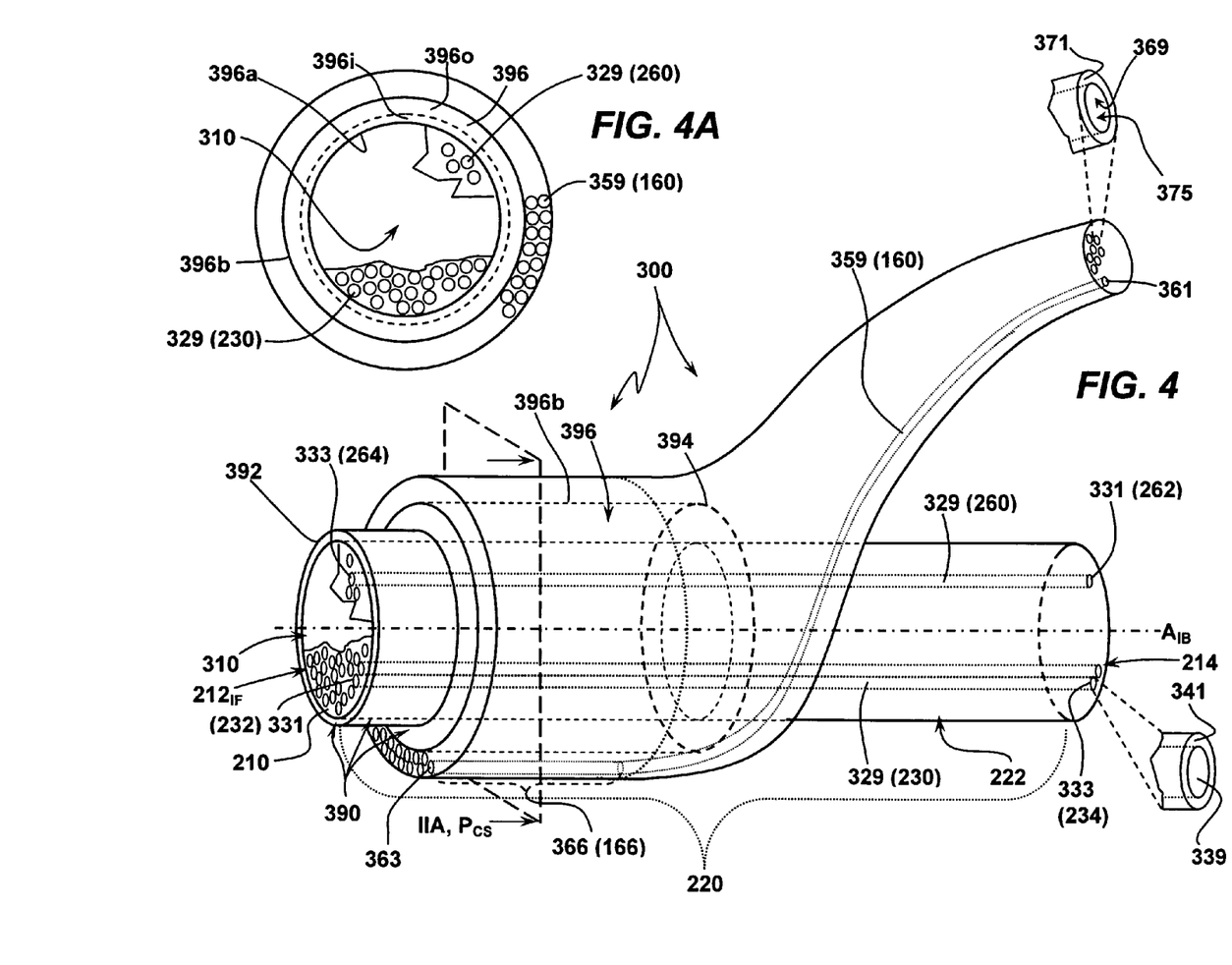
FIG. 4 shows a conduit bundle structurally analogous to the bundle of FIGS. 2 and 2A, wherein the first-type conduits are light-conductive conduits and the second-type conduits are capillaries.
FIG. 4A is a cross-sectional view of the conduit bundle of FIG. 4 as viewed into the plane $P_{CS}$.

FIGS. 4 and 4A and 5 and 5A depict still additional illustrative, non-limiting variations within the general scope and contemplation of the invention as expressed in the appended claims. In each of these illustrative versions, each conduit of one of the first-type and second-type conduits 130 and 160 is a hollow conduit (i.e., a capillary) and each conduit of the other of the first-type and second-type conduits is a light-conductive conduit 329. Referring to the version of FIGS. 4 and 4A, a conduit bundle 300 includes a light-transmissive conduit bundle 310 comprising a plurality of light-conductive conduits 329. Each light-conductive conduit 329 includes first and second ends 331 and 333 and comprises an optically transmissive core 339 having a core refractive index. Each core 339 is surrounded by a cladding material 341 having a cladding refractive index lower than the core refractive index such that light propagates through the conduit 329 by total internal reflection. In alternative versions, each light-conductive conduit 329 is either an imaging conduit or an illumination conduit such as the imaging and illumination conduits 230 and 260 depicted in the version of FIGS. 3 and 3A. In FIGS. 4 and 4A, the depiction of the light-transmissive conduit bundle 310 is "split" to facilitate efficient explanations of both scenarios. More particularly, a first set of light-conductive conduits 329 is depicted as a set of imaging conduits 230 terminating at an input-end face $212_{IF}$ corresponding to the first end 212 of an image-conducting bundle 210, while a second set of light-conductive conduits 329 is depicted as a set of illumination conduits 260 extending between light-collecting ends 262 and light-emission ends 264. While the "split" light-transmissive conduit bundle 310 of FIGS. 4 and 4A represents the two separate versions discussed above, it also represents a third that is within the scope and contemplation of the invention; that is, a version in which both a first subset of imaging conduits 230 and a second subset of illumination conduits 260 are among the light-conductive conduits 329 of the light-transmissive conduit bundle 310 in a single embodiment. As with other versions including a plurality of mutually and adjacently bonded light-conductive conduits, such as the imaging conduits 230 of FIGS. 3 and 3A, the mutual bonding of the light-conductive conduits 329 of the conduit bundle 310 is typically achieved by heat fusion of cladding material during the heating and drawing of a plurality of adjacently bundled mono-fibers (or clad rods) from an optical fiber drawing tower and/or heating under pressure in a die.

Referring still to the version of FIGS. 4 and 4A, the second-type conduits 160 are capillaries 359, each of which capillaries 359 includes open first and second ends 361 and 363 and an interior surface 369 defined by a capillary wall 371, and defining a hollow capillary channel 375 that extends between the first and second ends 361 and 363 of the capillary 359. The capillaries 359 facilitate either (i) the delivery of fluid (i.e., liquid or gas) to or (ii) the extraction of fluid from a region in space adjacent the second ends 363 of the capillaries 359. For instance, in a version in which light-conductive conduits 329 are imaging conduits 230, it may be desirable to deliver pressurized fluid, via the capillaries 359, to the viewing area in which the object (not shown) being viewed is located. This may be necessary to clean with air or water, for example, the object being viewed. Alternatively, it may be desirable in association with other applications to remove fluid from a viewing area through the capillaries 359. With a version including imaging conduits 230, illumination conduits 260 and capillaries 359, an object may, for instance, be illuminated, viewed and cleaned contemporaneously, provided that, for example, the second ends 363 of the capillaries 359 sufficiently proximate the input-end face $212_{IF}$ of the image-conducting bundle 210 to selectively (i) deliver fluid to and (ii) extract fluid from a region in space proximate the second ends 363 of the capillaries 359 and the input-end face $212_{IF}$ of the image-conducting bundle 210. The capillaries 359 are, in various versions, defined within a fused glass matrix by any of the methods alluded to in the summary or otherwise known to those of skill in the field of optical-fiber component fabrication.

A separation structure 390 may or may not be included in an embodiment including both light-conductive conduits 329 and capillaries 359. For purposes of illustration, the conduit bundle 300 of FIGS. 4 and 4A includes a separation structure 390. Each part of the separation structure 390 having a counterpart in the separation structures 190 and 290 of FIGS. 2 and 3 is referenced with a number beginning in "3," but ending in the same two digits as the reference number associated with its counterpart. Moreover, the descriptions of the separation structures 190 and 290 provided in connection with the descriptions of previous embodiments adequately explain the separation structure 390.

Figures 5, 5A:
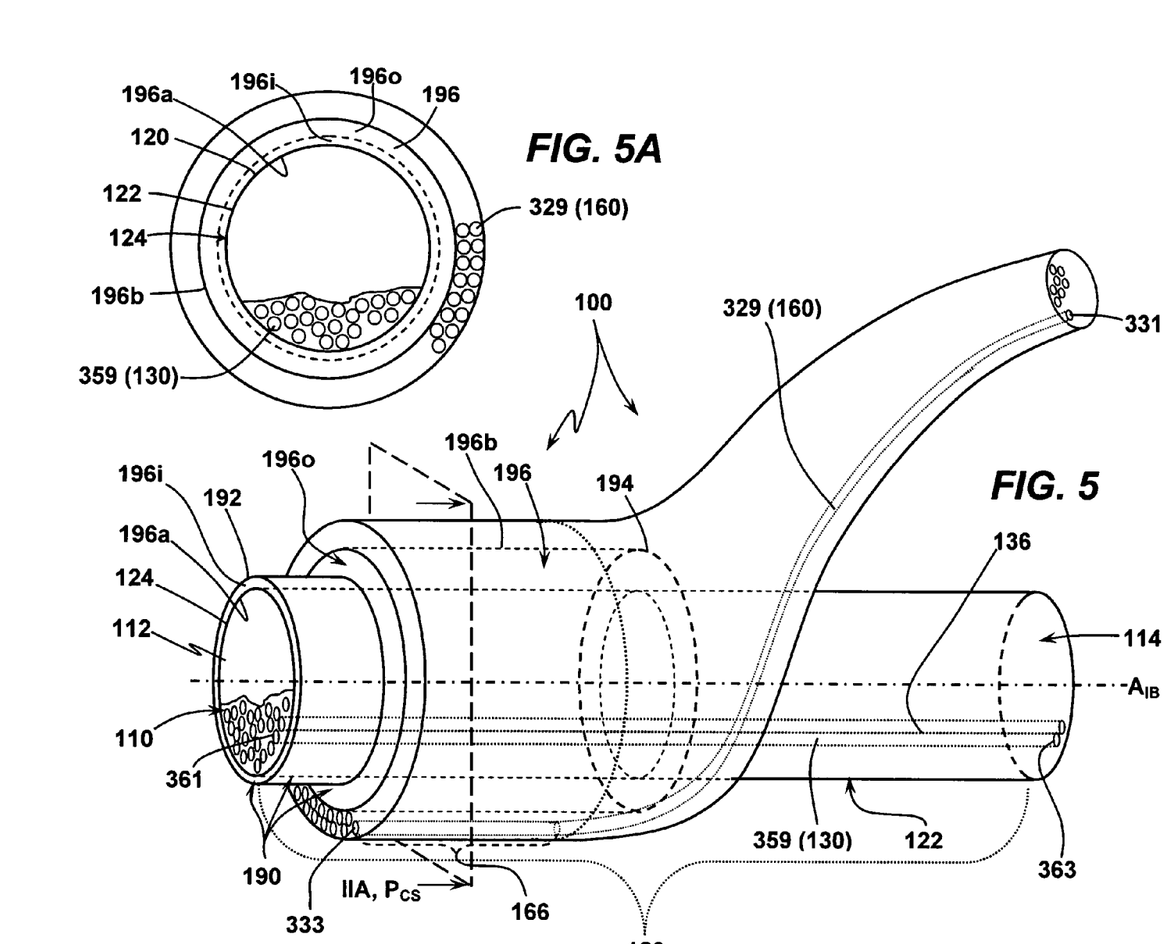
FIG. 5 shows a conduit bundle structurally analogous to the bundle of FIGS. 2 and 2A, wherein the first-type conduits are capillaries and the second-type conduits are light-conductive conduits.
FIG. 5A is a cross-sectional view of the conduit bundle of FIG. 5 as viewed into the plane $P_{CS}$.

Referring to the version of FIGS. 5 and 5A, the first-type conduits 130 are capillaries 359 and the second-type conduits are light-conductive conduits 339. The descriptions of the generic embodiment of FIGS. 2 and 2A, when combined with the descriptions of the various alternative embodiments of FIGS. 3 through 4A, render unnecessary a detailed explanation of the version of FIGS. 5 and 5A. The version of FIGS. 5 and 5A is basically similar to that of FIGS. 4 and 4A, wherein the positions of the capillaries 359 and the light-conductive conduits 329 have been reversed. That is, while in the version of FIGS. 4 and 4A, a bundle of light-conductive conduits 329 (whether imaging conduits 230 or illumination conduits 260) is surrounded by a set of capillaries 359, in the version of FIGS. 5 and 5A, an inner bundle 110 of capillaries is surround by a plurality of light-conductive conduits 329. Typically, in an embodiment such as that of FIGS. 5 and 5A, the light-conductive conduits 329 will be of the illuminating variety; however, relevant appended claims should not be so narrowly construed. An embodiment such as that of FIGS. 5 and 5A may be useful in illuminating a working area, for example, from which fluid is to be withdrawn or to which fluid is to be delivered via the inner bundle of capillaries 359.

The alternative embodiments thusfar described in the detailed description with reference to FIGS. 2 through 5A include a separation structure 190, 290 or 390. In any of these alternative embodiments, the separation structure 290 can be made at least partially opaque. Rendering the separation structure 190, 290 or 390 at least partially opaque in versions in which both the first and second-type conduits 130 and 160 are light-conductive conduits 329 is useful in preventing the leakage of light from one of the first and second-type conduits 130 and 160 into the other of the first and second-type conduits 130 and 160. Preventing such light leakage may be an especially beneficial aspect in versions such as that of FIGS. 3 and 3A in which the first-type conduits 130 are imaging conduits 230 combined to form an image-conducting bundle 210 and the second-type conduits are illumination conduits 260.

Figures 6, 6A:
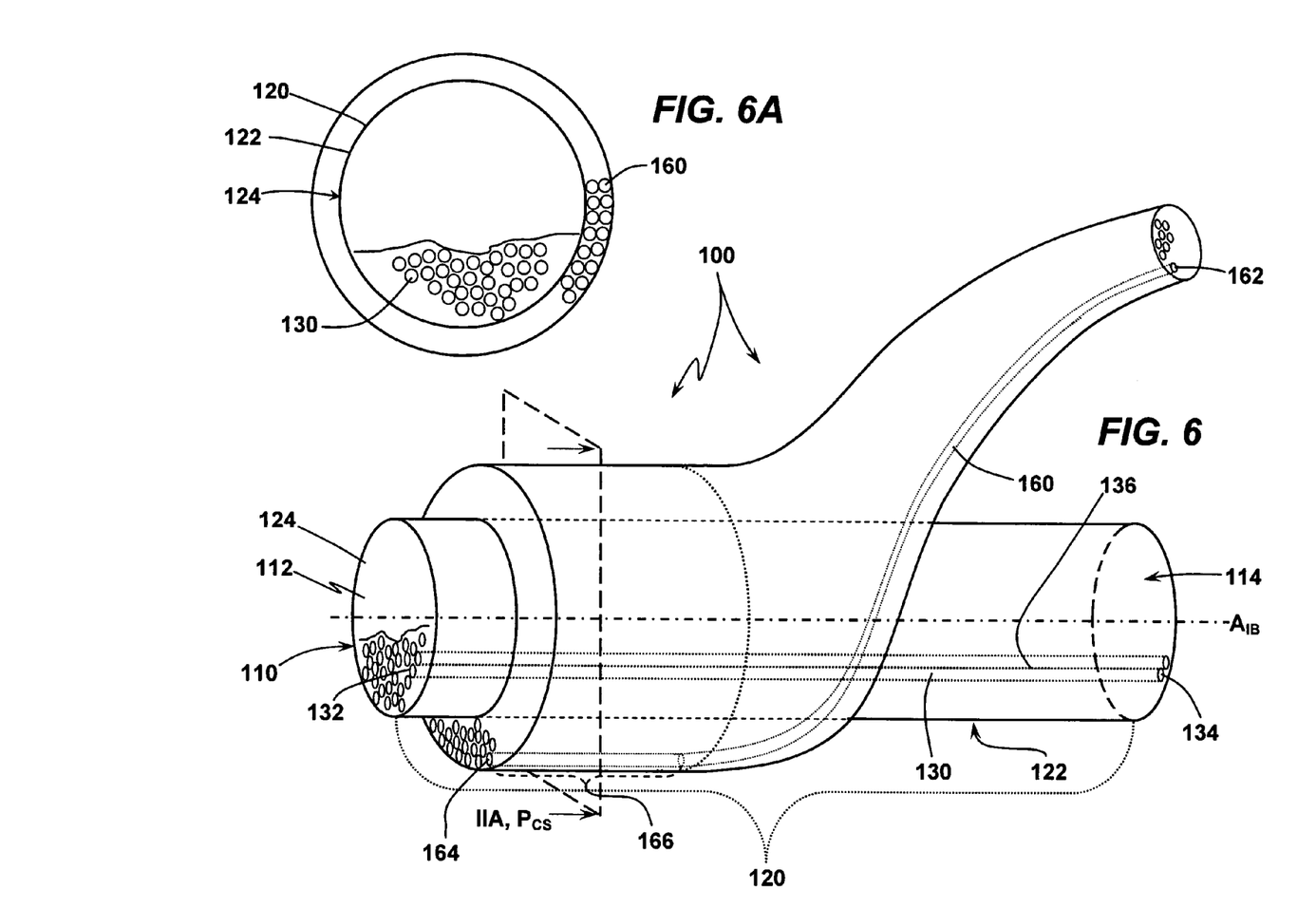
FIG. 6 shows a conduit bundle structurally analogous to the bundle of FIGS. 2 and 2A, wherein there is no separation structure between the first-type and second-type conduits.
FIG. 6A is a cross-sectional view of the conduit bundle of FIG. 5 as viewed into the plane $P_{CS}$.

As described in the summary, various versions do not include a separation structure 190 between the first-type conduits 190 and the second-type conduits 290. Shown in FIGS. 6 and 6A is an embodiment including an inner bundle 110 of adjacently bonded first-type conduits 130 and a plurality of second-type conduits 160 peripherally bonded directly to inner-bundle rigid region 120. The essence of the illustrative embodiment of FIGS. 6 and 6A is described in the first three paragraphs of the current detailed description. Accordingly, because the generic embodiment of FIGS. 6 and 6A is essentially the same as that of FIGS. 1 and 1A, with the separation structure 190 omitted, the description of the embodiment of FIGS. 1 and 1A through the paragraph just prior to that paragraph introducing the separation structure 190 serves as the description of the embodiment of FIGS. 6 and 6A. In referencing the aforementioned paragraphs in association with the version of FIGS. 6 and 6A, the reader will of course understand that when "FIG. 1," "FIG. 1A" or "FIGS. 1 and 1A" are encounter in the text, they are to be read as, respectively, "FIG. 6," "FIG. 6A" and "FIGS. 6 and 6A." Moreover, also to be understood is that either of the first and second-type conduits 130 and 160 in the illustrative generic embodiment of FIGS. 6 and 6A may be any of (i) capillaries 359, (ii) imaging conduits 230, and (iii) illumination conduits 260 such at those variously described in association with the versions of FIGS. 3 through 5A.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A conduit bundle comprising:
an inner bundle of plural elongated first-type conduits, each of the first-type conduits having first and second ends coinciding with inner-bundle first and second ends, wherein (a) the first-type conduits are mutually and adjacently bonded along coinciding portions of the lengths of the first-type conduits such that at least a region of the length of the inner bundle is rigid, (b) at least the inner-bundle rigid region (i) extends for a length along an inner-bundle axis along which the adjacently bonded portions of the constituent first-type conduits extend and (ii) is defined by at least one inner-bundle side such that, as viewed into a cross-sectional plane oriented orthogonally to the inner-bundle axis, the inner bundle exhibits a cross-sectional geometry defined by an inner-bundle periphery, and (c) each constituent first-type conduit of a selected set of first-type conduits exhibits, at least within the inner-bundle rigid region, a first cross-sectional geometry and a first diameter consistent, to within a predetermined tolerance, with a first set of pre-established dimensional parameters;
a rigid separation structure including a structure wall having structure-wall inside and outside surfaces, the structure-wall inside surface being peripherally bonded to at least one of the at least one sides of the inner-bundle rigid region; and
a plurality of elongated second-type conduits, each second-type conduit including a rigidly bonded region along at least a portion of the length thereof that is bonded to at least one of (i) the structure-wall outside surface and (ii) the bonded region of another second-type conduit of the plurality of second-type conduits;
wherein (i) at least the bonded regions of the second-type conduits are axially aligned with the inner-bundle axis, (ii) each second-type conduit of a selected set of second-type conduits exhibits a second cross-sectional geometry and a second diameter consistent, to within a predetermined tolerance, with a second set of pre-established dimensional parameters, and (iii) the separation structure is interposed between first-type conduits and second-type conduits.

2. The conduit bundle of claim 1 wherein
(a) each first-type conduit is a light-conductive imaging conduit comprising an optically transmissive core having an imaging-core refractive index and being surrounded by a cladding material having an imaging-cladding refractive index lower than the imaging-core refractive index such that light propagates through the first-type conduit by total internal reflection and such that the plural first-type conduits combine to form an image-conducting bundle;
(b) within the inner-bundle rigid region, the first-type conduits are fusedly bonded to one another;
(c) each second-type conduit is a light-conductive illumination conduit comprising a light-transmissive core having an illumination-core refractive index surrounded by a cladding material having an illumination-cladding refractive index;
(d) the rigid region of adjacently-fused imaging conduits terminates in an input-end face configured for inputting the image of an object for transmission of the image through the inner image-conducting bundle; and
(e) each illumination conduit includes a light-collecting end and a longitudinally opposed light-emission end, wherein the light-emission end is sufficiently proximate the input-end face to project light introduced into the light-collecting end onto the object the image of which is to be transmitted through the image bundle.

3. The conduit bundle of claim 2 wherein the structure-wall inside surface entirely surrounds at least a portion of the length of the inner-bundle rigid region.

4. The conduit bundle of claim 3 wherein the structure wall of the separation structure is at least partially opaque so as to prevent the introduction of light leaked from illumination conduits into the image-conducting bundle.

5. The conduit bundle of claim 3 wherein, in addition to a rigidly bonded region along which each illumination conduit is bonded to at least one of (i) the structure-wall outside surface and (ii) the bonded region of another illumination conduit, each illumination conduit of a selected set of illumination conduits includes a flexible region that is free to move relative to the inner-bundle rigid region.

6. The conduit bundle of claim 1 wherein at least one of:
(a) each conduit of one of the first-type conduits and the second-type conduits is a light-conductive conduit comprising an optically transmissive core having a first refractive index surrounded by a cladding material having a second refractive index lower than the first refractive index; and (b) each conduit of the other of the first-type conduits and the second-type conduits is a capillary including a hollow channel extending therethrough from a first end to a longitudinally opposed second end.

7. The conduit bundle of claim 6 wherein (a) each first-type conduit is a light-conductive imaging conduit comprising an optically transmissive core having an imaging-core refractive index and being surrounded by a cladding material having an imaging-cladding refractive index lower than the imaging-core refractive index such that light propagates through the first-type conduit by total internal reflection and such that the plural first-type conduits combine to form an image-conducting bundle;

(b) within the inner-bundle rigid region, the first-type conduits are at least one of (i) fusedly and (ii) adhesively bonded to one another;

(c) the rigid region of adjacently-fused imaging conduits terminates in an input-end face configured for inputting the image of an object for transmission of the image through the inner image-conducting bundle; and (d) each second-type conduit is a capillary having the second end thereof sufficiently proximate the input-end face of the image-conducting bundle to selectively (i) deliver fluid to and (ii) extract fluid from a region in space proximate the second end of the capillary and the input-end face of the image-conducting bundle.

8. A conduit bundle comprising:

an inner bundle of plural elongated first-type conduits, each of the first-type conduits having first and second ends coinciding with inner-bundle first and second ends, wherein (a) the first-type conduits are mutually and adjacently bonded along coinciding portions of the lengths of the first-type conduits such that at least a region of the length of the inner bundle is rigid, (b) at least the inner-bundle rigid region (i) extends for a length along an inner-bundle axis along which the adjacently bonded portions of the constituent first-type conduits extend and (ii) is defined by at least one inner-bundle side such that, as viewed into a cross-sectional plane oriented orthogonally to the inner-bundle axis, the. inner bundle exhibits a cross-sectional geometry defined by an inner-bundle periphery, and (c) each constituent first-type conduit of a selected set of first-type conduits exhibits, at least within the inner-bundle rigid region, a first cross-sectional geometry and a first diameter consistent, to within a predetermined tolerance, with a first set of pre-established dimensional parameters; and a plurality of elongated second-type conduits, each second-type conduit including a rigidly bonded region along at least a portion of the length thereof that is bonded to at least one of (i) the periphery of the inner-bundle rigid region and (ii) the bonded region of another second-type conduit of the plurality of second-type conduits; wherein (a) each conduit of one of the first-type conduits and the second-type conduits is a light-conductive conduit comprising an optically transmissive core having a first refractive index surrounded by a cladding material having a second refractive index lower than the first refractive index; and (b) each conduit of the other of the first-type conduits and the second-type conduits is a capillary including a hollow channel extending therethrough from a first end to a longitudinally opposed second end.

9. The conduit bundle of claim 8 wherein (a) each first-type conduit is a light-conductive imaging conduit comprising an optically transmissive core having an imaging-core refractive index and being surrounded by a cladding material having an imaging-cladding refractive index lower than the imaging-core refractive index such that light propagates through the first-type conduit by total internal reflection and such that the plural first-type conduits combine to form an image-conducting bundle;

(b) within the inner-bundle rigid region, the light-conductive imaging conduits are at least one of (i) fusedly and (ii) adhesively bonded to one another;

(c) the rigid region of adjacently-fused imaging conduits terminates in an input-end face configured for inputting the image of an object for transmission of the image through the inner image-conducting bundle; and (d) each second-type conduit is a capillary having the second end thereof sufficiently proximate the input-end face of the image-conducting bundle to selectively (i) deliver fluid to and (ii) extract fluid from a region in space proximate the second end of the capillary and the input-end face of the image-conducting bundle.

10. The conduit bundle of claim 8 wherein (a) each first-type conduit is a capillary;

(b) within the inner-bundle rigid region, the capillaries are at least one of (i) fusedly and (ii) adhesively bonded to one another; and (c) each second-type conduit is an illumination conduit comprising an optically transmissive core having an illumination-core refractive index and being surrounded by a cladding material having an illumination-cladding refractive index lower than the illumination-core refractive index such that light propagates through the illumination conduit by total internal reflection.

11. The conduit bundle of claim 8 wherein (a) each first-type conduit is a light-conductive imaging conduit comprising an optically transmissive core having an imaging-core refractive index and being surrounded by a cladding material having an imaging-cladding refractive index lower than the imaging-core refractive index such that light propagates through the light-conductive imaging conduit by total internal reflection and such that the plural light-conductive imaging conduits combine to form an image-conducting bundle;

(b) within the inner-bundle rigid region, the light-conductive imaging conduits are at least one of (i) fusedly and (ii) adhesively bonded to one another;

(c) the rigid region of adjacently-fused imaging conduits terminates in an input-end face configured for inputting the image of an object for transmission of the image through the inner image-conducting bundle;

(d) each second-type conduit is an illumination conduit comprising an optically transmissive core having an illumination-core refractive index and being surrounded by a cladding material having an illumination-cladding refractive index lower than the illumination-core refractive index such that light propagates through the illumination conduit by total internal reflection;

(e) each illumination conduit includes a light-collecting end and a longitudinally opposed light-emission end, which light-emission end is sufficiently proximate the input-end face to project light introduced into the light-collecting end onto the object the image of which is to be transmitted through the image bundle;

(f) each illumination conduit of a selected set of illumination conduits exhibits a second cross-sectional geometry and a second diameter consistent, to within a predetermined tolerance, with a second set of pre-established dimensional parameters; and (g) the first and second sets of pre-established dimensional parameters are such that at least one of (i) the diameters of the imaging conduits are different from the diameters of the illumination conduits and (ii) the cross-sectional geometries of the imaging conduits are different from the cross-sectional geometries of the illumination conduits.

12. The conduit bundle of claim 11 wherein the diameters of the imaging conduits are smaller than the diameters of the illumination conduits.

13. The conduit bundle of claim 12 further comprising:
a rigid separation structure including a structure wall having structure-wall inside and outside surfaces, wherein
(a) the structure-wall inside surface is peripherally bonded to at least one of the at least one sides of the inner-bundle rigid region; and
(b) the rigidly bonded region of each illumination conduit of a selected set of the illumination conduits is bonded to at least one of (i) the structure-wall outside surface and (ii) the bonded region of another illumination conduit of the plurality of illumination conduits such that the separation structure is interposed between the inner-bundle rigid region and at least one of the illumination conduits that is bonded to the inner-bundle rigid region.

14. The conduit bundle of claim 13 wherein at least one of (i) the structure-wall inside surface entirely surrounds at least a portion of the length of the inner-bundle rigid region and (ii) the structure wall of the separation structure is at least partially opaque so as to prevent the introduction of light leaked from illumination conduits into the image-conducting bundle.

15. The conduit bundle of claim 11 further comprising:
a rigid separation structure including a structure wall having structure-wall inside and outside surfaces, wherein
(a) the structure-wall inside surface is peripherally bonded to at least one of the at least one sides of the inner-bundle rigid region; and
(b) the rigidly bonded region of each illumination conduit of a selected set of the illumination conduits is bonded to at least one of (i) the structure-wall outside surface and (ii) the bonded region of another illumination conduit of the plurality of illumination conduits such that the separation structure is interposed between the inner-bundle rigid region and at least one of the illumination conduits that is bonded to the inner-bundle rigid region.

16. The conduit bundle of claim 15 wherein at least one of (i) the structure-wall inside surface entirely surrounds at least a portion of the length of the inner-bundle rigid region and (ii) the structure wall of the separation structure is at least partially opaque so as to prevent the introduction of light leaked from illumination conduits into the image-conducting bundle.

17. The conduit bundle of claim 15 wherein, in addition to a rigidly bonded region along which each illumination conduit is bonded to at least one of (i) the structure-wall outside surface and (ii) the bonded region of another illumination conduit, each illumination conduit of a selected set of illumination conduits includes a flexible region that is free to move relative to the inner-bundle rigid region.

18. The conduit bundle of claim 11 wherein, in addition to a rigidly bonded region along which each illumination conduit is bonded to at least one of (i) the periphery of the inner-bundle rigid region and (ii) the bonded region of another illumination conduit, each illumination conduit of a selected set of illumination conduits includes a flexible region that is free to move relative to the inner-bundle rigid region and relative to other illumination conduits.

* * * * *